United States Patent [19]

Chang

[11] 4,225,552

[45] Sep. 30, 1980

[54] DECORATIVE CANDLE

[76] Inventor: Se Won Chang, 19-2, Yorkchun-Dong, Seodaemungu, Seoul, Rep. of Korea

[21] Appl. No.: 871,434

[22] Filed: Jan. 23, 1978

[51] Int. Cl.[2] .................................. B29C 9/00

[52] U.S. Cl. .................................. 264/247; 264/254; 431/288; 425/803

[58] Field of Search ................ 431/126, 288; D71/25, D71/1 R; 53/3; 425/803; 264/246, 247, 248, 250, 254, 255, 261, 275

[56] References Cited

U.S. PATENT DOCUMENTS

| | | | |
|---|---|---|---|
| 2,586,978 | 2/1952 | Murray | 264/275 |
| 2,800,731 | 7/1957 | Carson | 264/275 |
| 3,072,970 | 1/1963 | Anderson | 264/247 |
| 3,294,888 | 12/1966 | Lindahl | 264/246 |
| 3,759,478 | 9/1973 | Schmitt | 425/803 |
| 3,982,677 | 10/1976 | Lundbom | D73/1 R |

FOREIGN PATENT DOCUMENTS

| | | | |
|---|---|---|---|
| 59603 | of 1891 | Fed. Rep. of Germany | 425/803 |

*Primary Examiner*—Samuel Scott
*Assistant Examiner*—G. Anderson

[57] ABSTRACT

A decorative candle and a process for manufacturing said candle wherein a central core including a wick is first formed, and decorative elements, for example flowers made of a wax having generally the same melting temperature as the central core, are caused to be adhered to the surface of the central core, and an outer shell of a wax composition which melts at a somewhat higher temperature and which is poured about the decorative elements to encase them within an outer shell.

2 Claims, 5 Drawing Figures

DECORATIVE CANDLE

BACKGROUND OF THE INVENTION

It is known to manufacture a candle having a relatively soft interior core and to surround such core with one or more layers or shells of wax-like composition which become progressively harder and which have progressively higher melting temperatures. An early U.S. patent disclosing such a construction is U.S. Pat. No. 27,706. Many forms of decorative candles are known, for example the candle disclosed in U.S. Pat. No. 1,707,889 is manufactured with an inner core to whose surface is affixed a dried flower coated with a transparent shellac. Subsequently, an outer shell of shellac is poured about the flower to encase it. U.S. Pat. No. 2,174,509 teaches the envelopment of a central core of parafin wax by a plurality of wax petals which unfold and as the central core progressively burns.

Although the decorative candles thus mentioned have certain attributes, particularly when used as decoration prior to igniting the wick, each presents certain disadvantages once the burning process has progressed to any great extent. The candle of U.S. Pat. No. 1,707,889, for example, speaks of dried flowers encased within the outer shell of the candle. It is likely that the dried flowers will partially or fitfully burn as the candle progressively burns lower leaving a charred skeleton. The wax petals of U.S. Pat. No. 2,974,509 gradually unfold due to the heat produced by the central core. In the configuration of this patent, the petals were obviously not meant to be consumed or melted. It is the concept of the present invention to produce a decorative candle wherein wax flowers or other decorative wax elements in various colors are encased within an outer shell whose melting temperature is somewhat higher than the melting temperature of the inner core of the candle. During the burning process, the inner core will burn more quickly than the outer shell and the flowers encased within it thus create the effect of lighting the flowers from within. As burning progresses, the flowers, together with the outer shell, begin to melt and the melting flowers will create interesting surrealistic patterns. Since the flowers themselves will be of the same melting temperature as the inner core, melting of the flowers will occur prior to melting of the outer core, which promotes the surrealistic effect. These and other aspects of the invention will be more fully disclosed and discussed with reference to the accompanying drawing and following description.

DESCRIPTION OF A PREFERRED EMBODIMENT

Figure 1:
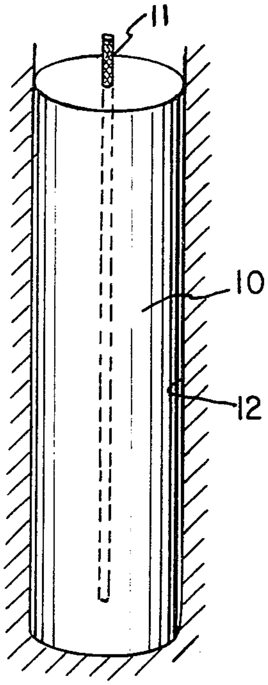
FIG. 1 is a diagrammatic illustration of the central core of the candle of the invention.

Referring now to the drawing, FIG. 1 illustrates a candle core 10 having a wick 11 molded therein. For purposes of the invention, the core 10 may be composed of 97% to 99% parafin wax having a 0.2% oil content and 1% to 3% steric acid. The melting point of this composition ideally would be about 138° F. The core 10 has been illustrated in FIG. 1 within a mold 12 which preferably is of a diameter of about 2" to 2¼".

Figure 2:
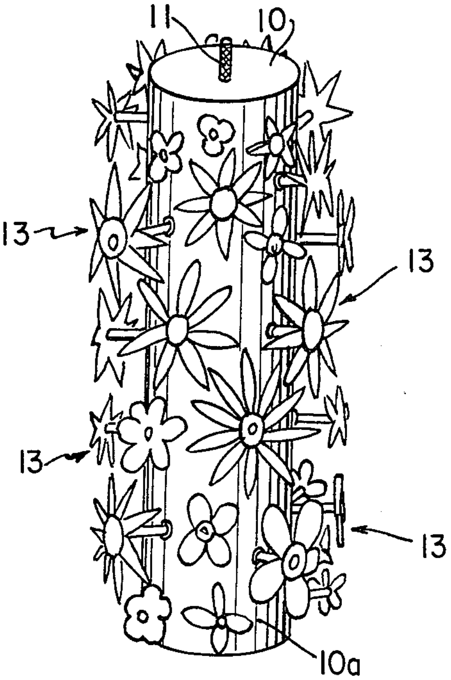
FIG. 2 illustrates the application of decorative elements in the form of flowers to the surface of the core of FIG. 1.
Figure 3:
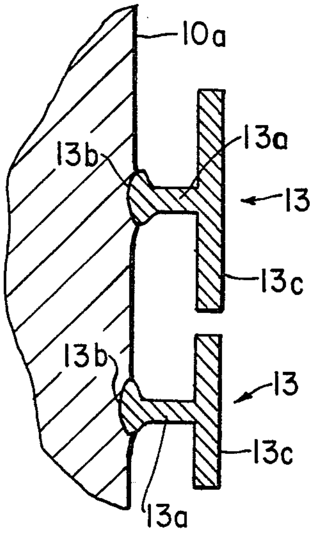
FIG. 3 is a detail showing of the method of application of the decorative elements.

In FIG. 2, the core 10 is shown removed from the mold 12 such that a plurality of decorative elements 13, shown in the form of flowers, may be affixed to the surface thereof. Although the decorative elements 13 may assume many forms and may be made of many different colors, they will have one thing in common, viz. they will be made essentially of the same material as the core 10 and have essentially the same melting temperature. As shown in FIG. 3, each of the elements 13 having a stem portion **13*a* will be caused to adhere to the surface 10*a* of the core 10 by first heating the end 13*b* slightly to cause melting thereof, and by applying pressure to cause a fusion of the end 13*b* and the surface 10*a* of the core 10. It will be noted that the stems 13*a* shall be of generally uniform length so that the outer peripheral surfaces 13*c* in effect project equidistantly from the cylindrical surface 10*a*** of the core.

Figure 4:
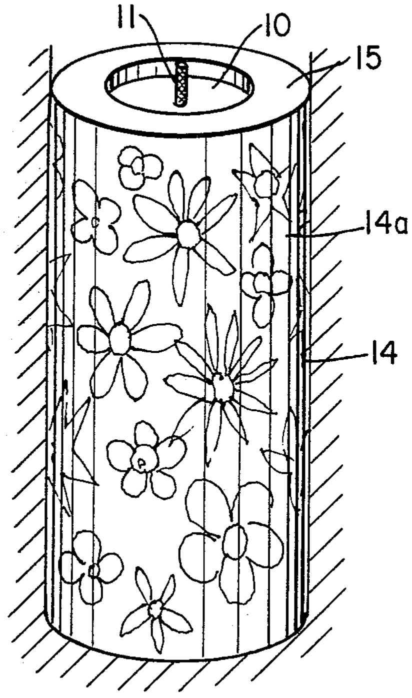
FIG. 4 illustrates the pouring of an outer shell of wax composition material about the central core to encase the decorative elements therein.
Figure 5:
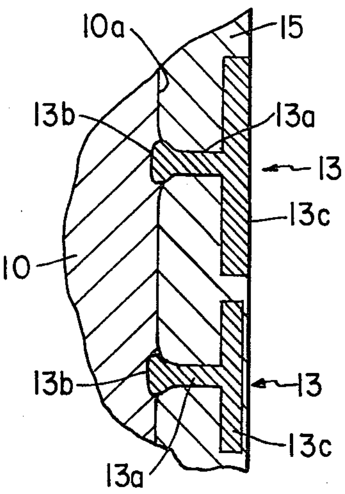
FIG. 5 is a detailed sectional view of the central core, the outer shell and the flowers encased therein.

With reference to FIG. 4, a second mold 14 is shown within which the core 10 is placed equidistantly from the walls **14*a* of the mold. When in this position, the surfaces 13*c* of the flower elements 13 will very nearly contact the inner walls 14*a* of the mold. Thereafter and in this position, a wax composition is poured as an outer shell 15 about the core 10 to encase the flower elements 13 therein. This composition shall be 98% to 99% parafin wax having a maximum oil content of 0.2% and 1% to 2% steric acid. The melting temperature of the wax composition of the outer shell 15 shall be ideally slightly higher than 138° F. but no higher than 143° F. Notwithstanding the fact that the melting temperatures of the flower elements 13 is approximately 138° F., the pouring of the outer shell composition about these flower elements will not cause melting of them since the temperature difference between them and the wax of the outer shell is so slight. Consequently, the flower elements 13 will be encased within the wall of the outer shell 15 as illustrated in FIG. 5. As mentioned previously, the respective outer peripheries 13*c* of the elements 13 shall very nearly project from the surface 10*a* of the core 10 an amount equal to the width of the shell 15; however, in general, there will be some slight excess of material of shell 15 encasing the outer surface 13*c*, and the candle may be desirably forced through an extrusion dye (not shown) to provide high polish and lustre to the exterior surface of the candle without the surface of the dye contacting the exterior surfaces 13*c*** of the flower elements.

The width of the outer shell 15 ideally will be no more than ¼ of an inch and preferably ⅛ of a inch while the overall diameter of the candle should be about 2½" to 2½". The height may vary, but preferably will be about 8" to 10".

During the burning process, the core 10, having a lower melting point, will tend to burn at a somewhat greater rate leaving a depression which is the difference in the burning height of the core 10 and the outer shell 15. This depression will increase until the enclosed heat of the burning wick within the surrounding shell 15 causes an interesting phenomenon to occur. The wax flower elements 13 have the same melting temperature as the inner core 10 and because of this fact, the flower elements not only will be caused to melt as the candle progressively burns lower, but will begin to melt and flow inwardly from the outer core 15 prior to progressive consumption of the outer shell. As the flame burns lower within the outer shell, it will illuminate the many colored flowers encased within the shell, and as these melt, various surrealistic effects will result. These varying and very beautiful effects will continue as the entire candle is consumed.

It will be understood that the foregoing description has been of a particular embodiment of the invention and that such description is therefore merely representative. In order to understand fully the scope of the invention, reference should be made to the appended claims.

I claim:

1. A method of manufacturing a decorative candle comprising the steps of forming a central cylindrical core of a wax composition material having one melting temperature, causing a plurality of decorative wax elements of essentially the same wax composition and melting temperature to be fused by heat to the surface of said core and to project therefrom generally equidistantly, pouring an outer shell of a second wax composition having a slightly higher melting temperature about said core to encase said decorative elements such that said decorative elements extend essentially for the entire width of said outer core.

2. The method of claim 1 wherein said core is formed of 97% to 99% paraffin wax and 1% to 3% steric acid having a melting temperature of about 138° F. and said outer shell is formed of 98% to 99% parafin wax and 1% to 2% steric acid having a melting temperature slightly greater than 138° F. but no higher than 143° F.

* * * * *